(12) United States Patent
Kim

(10) Patent No.: US 6,175,572 B1
(45) Date of Patent: Jan. 16, 2001

(54) BANDWITH ALLOCATING METHOD BY USING SUB-TABLES IN AN ATM NETWORK INTERFACE CARD

(75) Inventor: Deog-Nyoun Kim, Seoul (KR)

(73) Assignee: Daewoo Electronics Co., Ltd., Seoul (KR)

(*) Notice: Under 35 U.S.C. 154(b), the term of this patent shall be extended for 0 days.

(21) Appl. No.: 09/052,412

(22) Filed: Mar. 31, 1998

(30) Foreign Application Priority Data

Mar. 31, 1997 (KR) .................................................. 97-11848

(51) Int. Cl.[7] .................................................. H04L 12/56
(52) U.S. Cl. ........................... 370/468; 370/463; 370/477
(58) Field of Search .................................. 370/395, 401, 370/412, 419, 420, 428, 429, 463, 465, 468, 474, 477

(56) References Cited

U.S. PATENT DOCUMENTS

| | | | |
|---|---|---|---|
| 5,265,091 | * 11/1993 | Van Landegem | 370/468 |
| 5,463,620 | * 10/1995 | Sriram | 370/412 |
| 5,712,851 | 1/1998 | Nguyen et al. | 370/399 |
| 5,734,825 | * 3/1998 | Lauck et al. | 395/200.13 |
| 5,982,771 | * 11/1999 | Caldara et al. | 370/389 |
| 8,578,029 | * 3/1999 | Hasegawa et al. | 370/236 |

FOREIGN PATENT DOCUMENTS

| | | |
|---|---|---|
| 0690596 | 1/1996 | (EP) . |
| 0782303 | 7/1997 | (EP) . |
| 0797372 | 9/1997 | (EP) . |

* cited by examiner

*Primary Examiner*—Ricky Ngo
(74) *Attorney, Agent, or Firm*—Anderson Kill & Olick, PC

(57) ABSTRACT

A method for allocating bandwidth to virtual channels by using a bandwidth allocation table in an ATM network, wherein the bandwidth allocation table has a main table divided into a multiplicity of entries and each entry has a plurality of sub-tables, checks a flag of an entry of the main table. If the flag has a first value, an index of a virtual channel recorded at the entry of the main table is read and if the flag has a second value, an entry of a sub-table at which the index of the virtual channel is recorded is detected and the index is read. Thereafter, cells of the virtual channel corresponding to the index are serviced and the above procedure is repeated until cells of a virtual channel corresponding to a last entry of the main table are serviced.

10 Claims, 7 Drawing Sheets

| 123 | 16 | 16 | 5 |
|-----|----|----|----|
| 25 | 18 | 3 | 255 |
| . | | | |
| . | | | |
| . | | | |
| 8 | 8 | 8 | 9 |

BANDWITH ALLOCATING METHOD BY USING SUB-TABLES IN AN ATM NETWORK INTERFACE CARD

FIELD OF THE INVENTION

The present invention relates to a bandwidth allocation method; and, more particularly, to a hierarchical bandwidth allocation method by using sub-tables in an ATM network interface card.

DESCRIPTION OF THE PRIOR ART

An ATM (Asynchronous Transfer Mode) communication network is implemented by using hierarchical protocols so as to support a various kinds of services. While the conventional public telephone network and packet switching network are exclusive networks for providing a voice service and data service, respectively, the ATM network is constructed to provide a voice service, a data service, a video service and so on, as an integrated network.

In order to provide the various kinds of services, the ATM network statistically multiplexes and transmits information in unit of a limited size, i.e., packets or cells through virtual channels. To each of the virtual channels, a bandwidth is allocated by using a bandwidth allocation table in a control memory of an ATM network interface card.

Referring to FIG. 1, there is provided a block diagram of a host system 10 and an ATM network interface card 20. The host system 10 includes a host memory 11, a processor 12 and bus controller 13 and is connected with the ATM network interface card 20 through an I/O(Input/Output) bus 30. At the processor 12 of the host system 10, application programs for use in providing users with services are executed and a network interface card driver(not shown) for use in providing ATM communication capability is implemented therein. The network interface card driver sets up various kinds of tables and rings associated with ATM communication and updates data of the tables in response to a request of the application programs.

The ATM network interface card 20 is directly controlled by the network interface card driver; divides packets to be transmitted into ATM cells and transmits the ATM cells to the ATM network in response to a request of an application program; and forms packets by reassembling received ATM cells and delivers the packets to the application program.

As is shown in FIG. 1, the ATM network interface card 20 includes an AAL(ATM Adaptation Layer) processor 21, a SONET(Synchronous Optical NETwork)/ATM line adapter 22, a transceiver 23, an EPROM 24 and a control memory 25. The AAL processor 21 is connected to the control memory 25 via a 32 bit local memory bus 27 and to the EPROM 24 via an 8 bit local slave bus 26. The EPROM 24 is also connected to the SONET/ATM line adapter 22 via the local slave bus 26. Further, the AAL processor 21 can directly access the host memory 11 in the host system 10 via the I/O bus 30 and read from the control memory 25 and write data thereon. The processor 12 in the host system 10 can also read from the control memory 25 and write data thereon by directly accessing it via the I/O bus 30.

When an application program applied at the host system 10 requests a service associated with ATM, the network interface card driver of the host system 10 provides the service to the application program. For example, if an application program stores certain message data in the host memory 11 and requests the host system 10 to transmit the message data, the network interface card driver requests, via the I/O bus 30, the AAL processor 21 to transmit the message data.

The AAL processor 21 reads the message data stored in the host memory 11 in a fixed length unit, for example, 48-byte; forms ATM cells according to an AAL protocol format; and delivers the ATM cells to the SONET/ATM line adapter 22. The SONET/ATM line adapter 22 maps the ATM cells into a predetermined format suitable for optical transmission and the transceiver 23 converts the formatted serial data into an optical signal and transmits it to the ATM network.

Meanwhile, data received by the transceiver 23 from the ATM network is divided into ATM cells and then inputted to the AAL processor 21 via the SONET/ATM line adapter 22. The AAL processor 21 separates headers and payloads from the ATM cells; restores a message by reassembling the payloads; notifies the host system 10 of the completion of reassembling the message by using interrupt. When the interrupt notifying the completion of reassembling the message is received from the AAL processor 21 is, the network interface card driver of the host system 10 transmits the received message to the application program according to a predetermined procedure.

At the bandwidth allocation table of the control memory 25, indices designating virtual channels assigned for transmitting or ATM cells are stored at entries thereof, thereby allowing a bandwidth to be allocated to each virtual channel. When the size of the bandwidth allocation table, i.e., the number of entries constituting the bandwidth allocation table, and a transmission rate or a bandwidth of a physical link are determined, a transmission rate for one entry of the bandwidth allocation table maybe calculated as:

$$C_v = V/N \text{(bps)} \qquad \text{Eq. (1)}$$

wherein $C_v$ is the transmission rate for one entry of the bandwidth allocation table; V is an overall transmission rate of the physical link; and N is the number of entries constituting the bandwidth allocation table, the physical link representing the virtual channels designated by the entries of the bandwidth allocation table.

For instance, if the transmission rate of a physical link is 100 Mbps and the number of the entries constituting the bandwidth allocation table is 100, the transmission rate for one entry of the bandwidth allocation table is 1 Mbps.

A bandwidth is allocated to a virtual channel depending on the frequency of the index of the virtual channel recorded at the entries of the bandwidth allocation table. If the transmission rate of one entry of the bandwidth allocation table is 1 Mbps and a required bandwidth of a virtual channel is 4.5 Mbps, the index indicating the virtual channel is recorded at 5 entries of the bandwidth allocation table. FIG. 2 represents an exemplary bandwidth allocation table, wherein indices of virtual channels are recorded at entries constituting the bandwidth allocation table, each of the indices being of 8 bits representing one of the virtual channels 0–255.

The AAL processor 21 sequentially accesses the entries of the bandwidth table and transmits data through the virtual channels indicated by indices recorded at entries of the bandwidth allocation table.

In the conventional bandwidth allocation scheme described above, a significant loss of bandwidth may be incurred if the bandwidth for one entry is large. For instance, if the bandwidth of a channel 1 is 1.5 Mbps, the bandwidth of a channel 2 is 64 Kbps and the bandwidth of one entry of the bandwidth allocation table is 1 Mbps, the index of the channel 1 is recorded at 2 entries and the index of the channel 2 is recorded at 1 entry. The bandwidth loss for this case is 0.5 Mbps for the channel 1 and 936 Kbps for the channel 2, respectively.

Accordingly, it is necessary to reduce the bandwidth of each entry of the bandwidth allocation table by increasing the number of entries constituting the bandwidth allocation table. However, the reduction of the allocated bandwidth for each entry of the table by a certain degree results in the number of entries increased by the identical degree, causing the operational inefficiency due the increased number of entries.

SUMMARY OF THE INVENTION

It is, therefore, a primary object of the invention to provide a method for efficiently allocating a bandwidth to a virtual channel by using sub-tables.

In accordance with an aspect of the present invention is to provide a method f or allocating bandwidths to virtual channels by using a bandwidth allocation table in an ATM network, wherein the bandwidth allocation table is divided into a multiplicity of entries and each of the entries has a plurality of hierarchically structured sub-tables, comprising the steps of: (a) checking a flag of an entry of the bandwidth allocation table, wherein the entry is indicated by a main entry pointer; (b) reading an index of a virtual channel recorded at the entry indicated by the main entry pointer if the flag has a first value; (c) detecting an entry of a sub-table at which the index of the virtual channel is recorded and reading the index of the virtual channel recorded at the entry of the sub-table if the flag has a second value; (d) serving cells of the virtual channel corresponding to the index; (e) increasing the main entry pointer value by 1 to thereby indicate a next entry of the bandwidth allocation table; and (f) repeating the steps (a) to (e) until cells of a virtual channel corresponding to a last entry of the bandwidth allocation table are serviced.

In accordance with another aspect of the present invention, there is provided a method for allocating bandwidth to virtual channels by using a bandwidth allocation table in an ATM network, wherein the bandwidth allocation table is divided into a multiplicity of entries and a main entry pointer indicates one of the entries, each of the entries having a sub-table pointer which indicates one of a plurality of sub-entry pointers and each of the sub-entry pointers indicating an entry of a corresponding sub-table, comprising the steps of: (a) checking a main flag of an entry of the main table indicated by the main entry pointer; (b) reading an index of a virtual channel recorded at the entry of the main table indicated by the main entry pointer if the main flag has a first value; (c) reading an index of a virtual channel recorded at an entry of a sub-table if the main flag has a second value, wherein the entry of the sub-table is indicated by a sub-entry pointer, the sub-entry pointer is indicated by a sub-table pointer and the sub-table pointer is recorded at the entry of the main table indicated by the main entry pointer; (d) serving cells of the virtual channel corresponding to the index; (e) increasing the main entry pointer value by 1 to thereby indicate a next main entry of the main table; and (f) repeating the steps (a) to (e) until cells of a virtual channel corresponding to a last main entry of the main table are serviced.

BRIEF DESCRIPTION OF THE DRAWINGS

The above: and other objects and features of the present invention will become apparent from the following description of preferred embodiments given in conjunction with the accompanying drawings, in which.

DETAILED DESCRIPTION OF THE PREFERRED EMBODIMENTS

In accordance with the preferred embodiments of the present invention, an entry of a bandwidth allocation table can be divided into sub-entries or a divided bandwidth can be allocated thereto, which results in subdivision of bandwidth.

Figure 1:
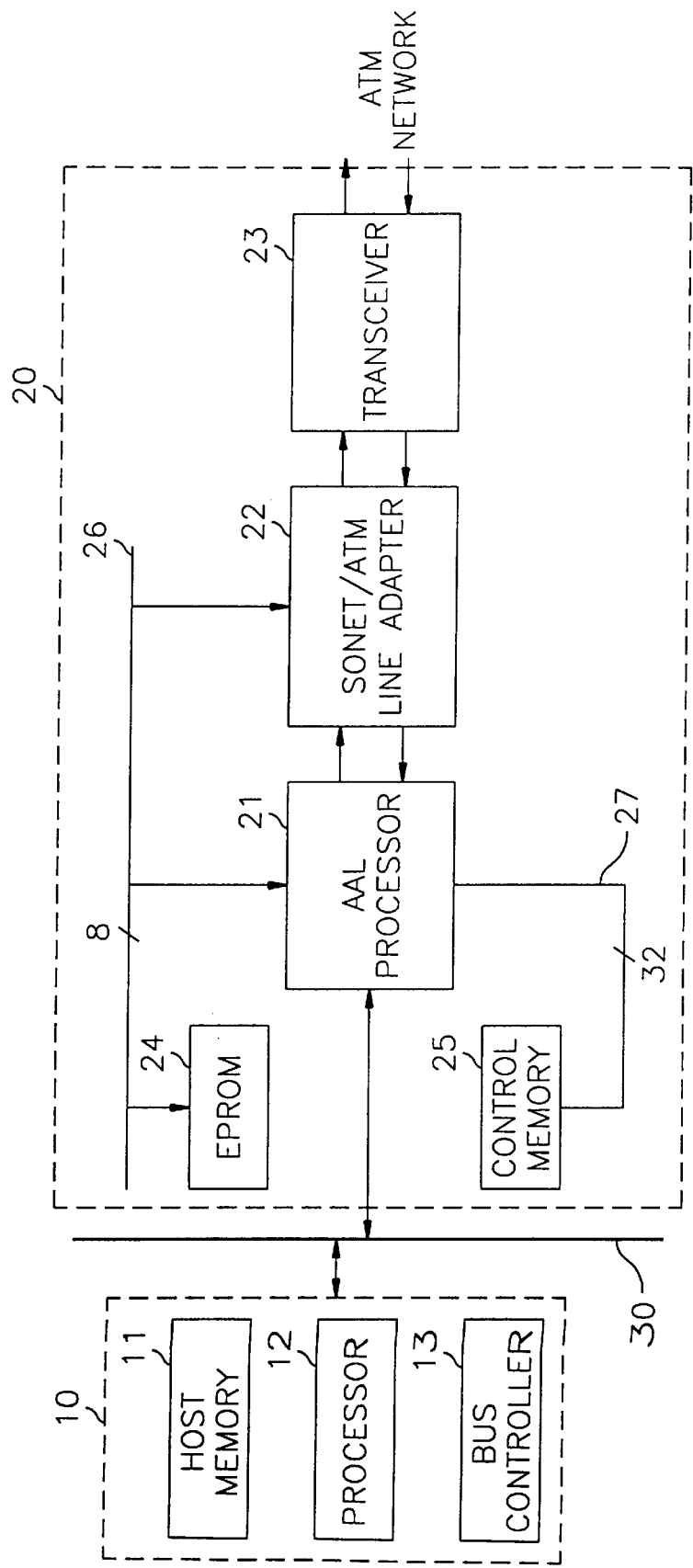
FIG. 1 represents a block diagram of a host system and an ATM network interface card.
Figures 2, 3:
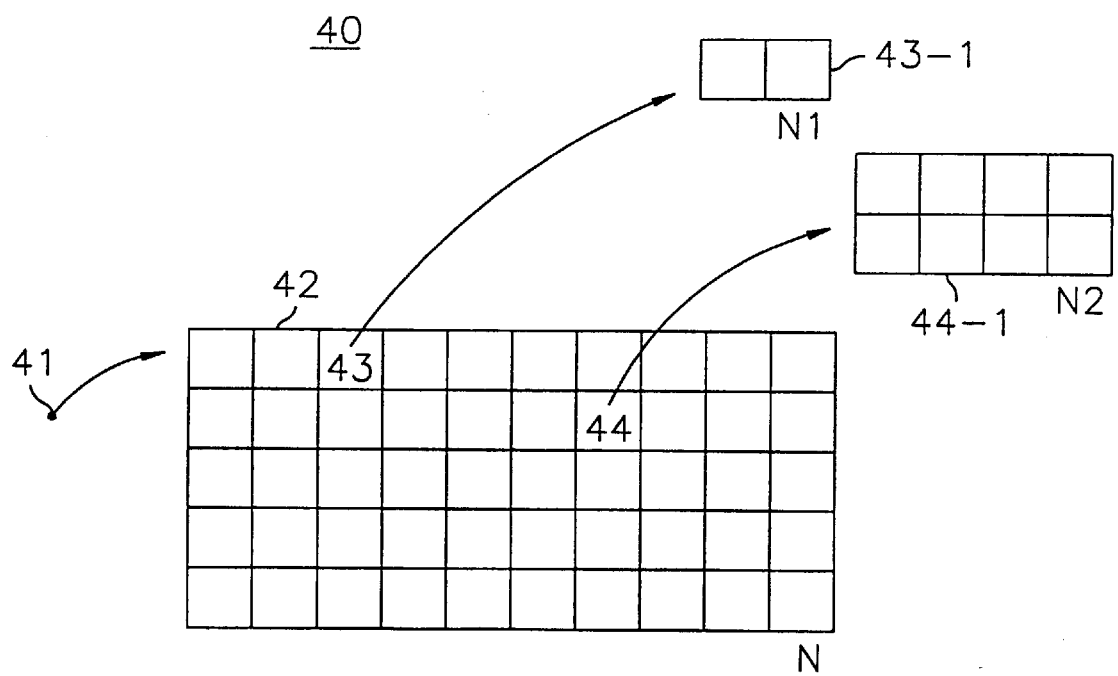
FIG. 2 presents an example of a conventional bandwidth allocation table.
FIG. 3 shows a bandwidth allocation table in accordance with a first embodiment of the present invention.

Referring to FIG. 3, there is provided a bandwidth allocation table 40 in accordance with a first embodiment of the present invention. The bandwidth allocation table 40 includes a main entry pointer 41 and a main table 42 having N main entries, wherein each main entry can have two or more sub-entries therein, which can have different indices representing virtual channels.

In accordance with the present invention, each main entry includes a flag representing whether contents of the main entry indicated by the main entry pointer 41 is an index of a virtual channel or a sub-entry pointer indicating a sub-entry included in the main entry. For example, if a flag is "0", the contents of a corresponding main entry is an index of a virtual channel; and if the flag is "1", the contents of the main entry is a sub-entry pointer indicating a sub-entry included therein, the sub-entry having therein an index representing a virtual channel.

If the number of main entries constituting the table 42 is N and the numbers of sub-entries 43-1 and 44-1 constituting main entries 43 and 44 are N1, e.g., 2, and N2, e.g., 8, with a transmission rate of a physical link being L, respectively, a bandwidth of one main entry is L/N, a bandwidth of one sub-entry of the main entry 43 is $L/(N \times N1)$ and a bandwidth of one sub-entry of the main entry 44 is $L/(N \times N2)$. Since the bandwidths of the sub-entries included in the main entry 43 and 44 are much smaller than that of the main table 42, it is possible to allocate a bandwidth to a virtual channel with less bandwidth quantization loss.

Figure 4:
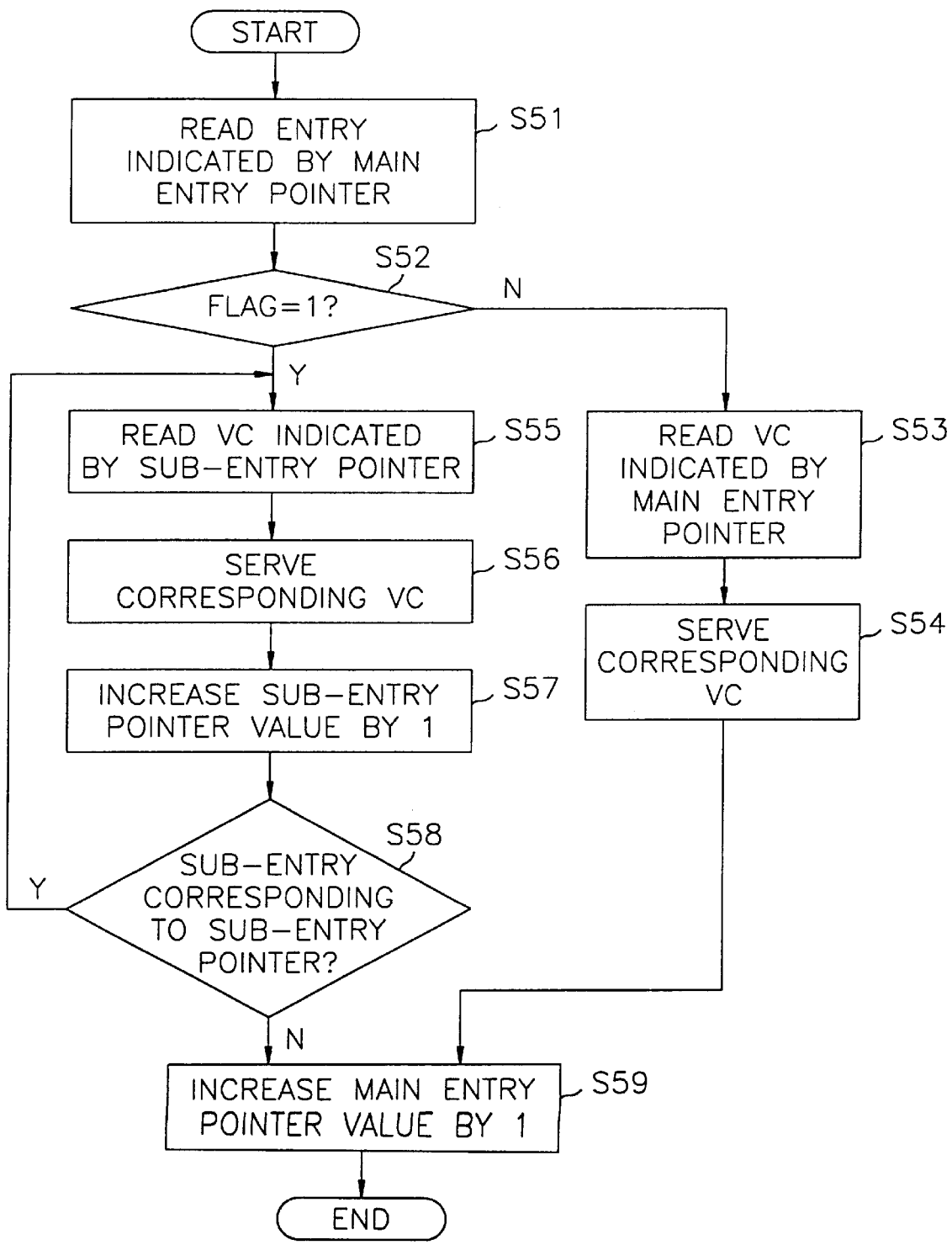
FIG. 4 is a flow chart for allocating a bandwidth to a virtual channel in accordance with the first embodiment of the present invention.

Referring to FIG. 4, there is illustrated a procedure to allocate a bandwidth to a virtual channel in accordance with the first embodiment of the present invention.

The procedure starts with step S51 which reads a main entry of a table indicated by a main entry pointer. At step S52, the contents of the main entry designated by the main entry pointer is examined by checking a flag thereof. If the flag is "0", the procedure goes to step S53, wherein a virtual channel (VC) corresponding to an index recorded at the main entry is recognized. Next, at step S54, the VC recognized at step S53 is served by transmitting ATM cells corresponding to the VC and the process proceeds to step S59.

If the flag is determined as "1" at step S52, the contents of a sub-entry indicated by a sub-entry pointer of the main entry is read at step S55, wherein the contents of the sub-entry is an index of a virtual channel to be served. At a subsequent step S56, the virtual channel registered at the sub-entry is served. Then at step S57, the value of the sub-entry pointer is increased by 1 to thereby indicate a next sub-entry.

Thereafter, it is checked whether there exists a sub-entry indicated by the sub-entry pointer. If the result is affirmative, the procedure returns to step S55. If negative, the process goes to step S59, wherein the main entry pointer is increased by 1 to thereby indicate a next main entry of the table. For the next main entry of the table, the same procedure is repeated.

Figure 5:
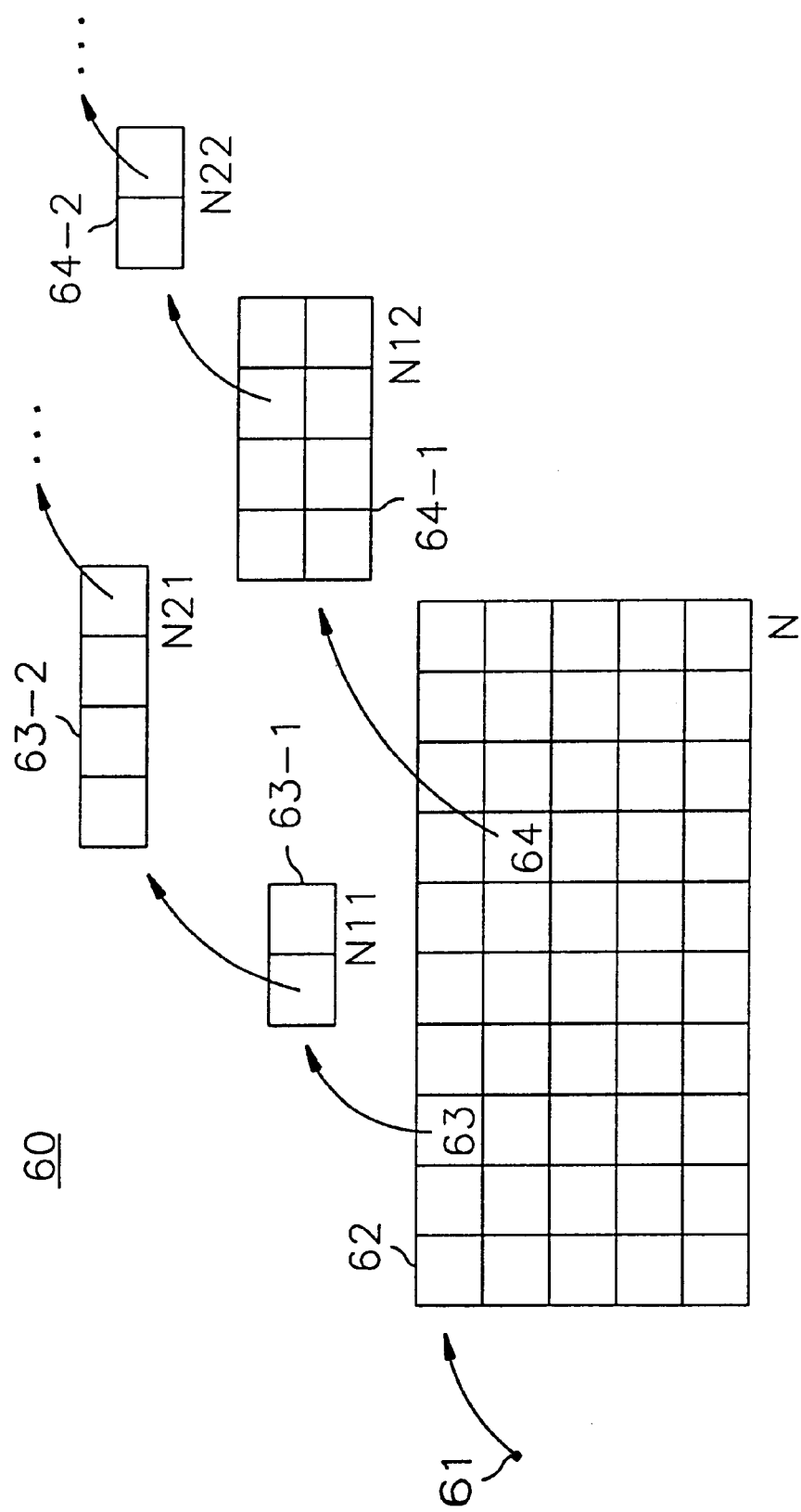
FIG. 5 illustrates a bandwidth allocation table in accordance with a second embodiment of the present invention.

Referring to FIG. 5, there is provided a bandwidth allocation table 60 in accordance with a second embodiment of the present invention.

The bandwidth allocation table 60 includes a pointer of a first hierarchy, i.e., a main entry pointer 61 and a main table 62 having N entries of the first hierarch, wherein each entry of the first hierarchy can have two or more entries of the second hierarchy and so on. That is, in accordance with the second embodiment of the invention, an entry of a hierarchy can have a plural number of entries of a next hierarchy. Further, each entry of a hierarchy includes a flag representing whether the corresponding entry includes entries of a next hierarchy. In case the flag indicates that there is no entries of the next hierarchy, contents of the corresponding entry is an index representing a virtual channel to be served. If the flag indicates that there exist entries of the next hierarchy, contents of the corresponding entry is a pointer indicating one of the entries of the next hierarchy.

For example, if a flag is "0", the contents of a corresponding entry is an index of a virtual channel; and if the flag is "1", the contents of the corresponding entry is a pointer indicating an entry of a next hierarchy.

If the number of entries of the first hierarchy constituting the main table 62 is N, and a bandwidth of a physical link is L, a bandwidth for one entry of the first hierarchy is L/N. When an entry 63 of the first hierarchy has N11, e.g., 2, entries of the second hierarchy 63-1, a bandwidth for each of the entries of the second hierarchy is L/(N×N11). Further, if one of the entries 63-1 of the second hierarchy includes N21, e.g., 4, entries 63-2 of the third hierarchy, a bandwidth of L/(N×N11×N21) is allocated to each of the entries 63-2 of the third hierarchy. Similarly, an entry 64 of the first hierarchy includes N12, e.g., 8, entries 64-1 of the second hierarchy and one of the entries 64-1 further includes N22, e.g., 2, entries 64-2 of the third hierarchy, a bandwidth for each of the entries 64-1 corresponds to L/(N×N12) and the one for each of the entries 64-2 is L/(N×N12×N22).

As described above since a bandwidth can be adjusted adaptively to an individual entry, it is possible to allocate a bandwidth to a virtual channel with less bandwidth quantization loss.

Figure 6:
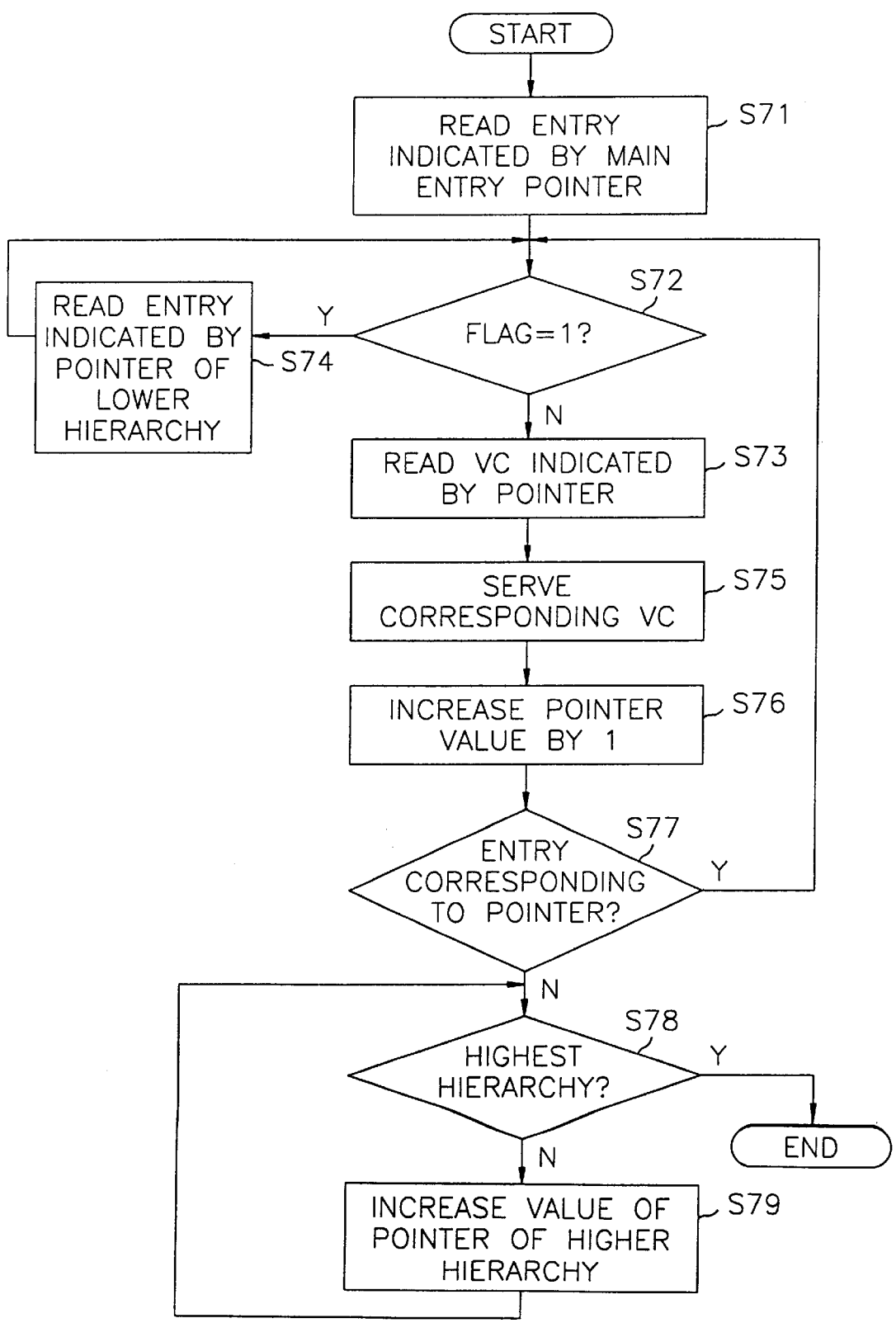
FIG. 6 is a flow chart for allocating a bandwidth to a virtual channel in accordance with the second embodiment of the present invention.

In reference to FIG. 6, there is illustrated a procedure for allocating a bandwidth to a virtual channel in accordance with the second embodiment of the present invention.

The procedure starts with step S71 which reads a first entry of the highest or the first hierarchy in the main table 62 indicated by a main entry pointer 61. The main entry pointer 61 corresponds to a pointer of the highest hierarchy. At step S72, the contents of the entry is examined by checking a flag of the entry. If the flag is "0", the procedure goes to step S73, wherein a VC corresponding to an index recorded at the entry is recognized; and if the flag is "1", the procedure goes to step S74, wherein an entry of a lower, i.e., the second, hierarchy indicated by a pointer of the lower hierarchy is read and step S72 is repeated.

At step S75, the VC read at step S73 is served. Then, the value of the pointer utilized at step S73 is increased by 1 at step S76. Subsequently, at step S77 it is checked whether there exists an entry corresponding to the pointer processed at step S76. If exists, the process goes back to step S72 and the same process is repeated. Otherwise, the process proceeds to step S78 and it is determined whether the pointer processed at step S76 is of the highest hierarchy. If the determination result is negative, which implies that there might remain one or more entries of a higher hierarchy, the process advances to step S79.

At step S79, the pointer value of the higher hierarchy is increased by 1 and the process repeats at step 78. On the other hand, if it is determined that the pointer processed at step S76 is of the highest hierarchy, the bandwidth allocation procedure terminates. The procedure described above may be repeated until all the ATM cells to be served are processed.

Figure 7:
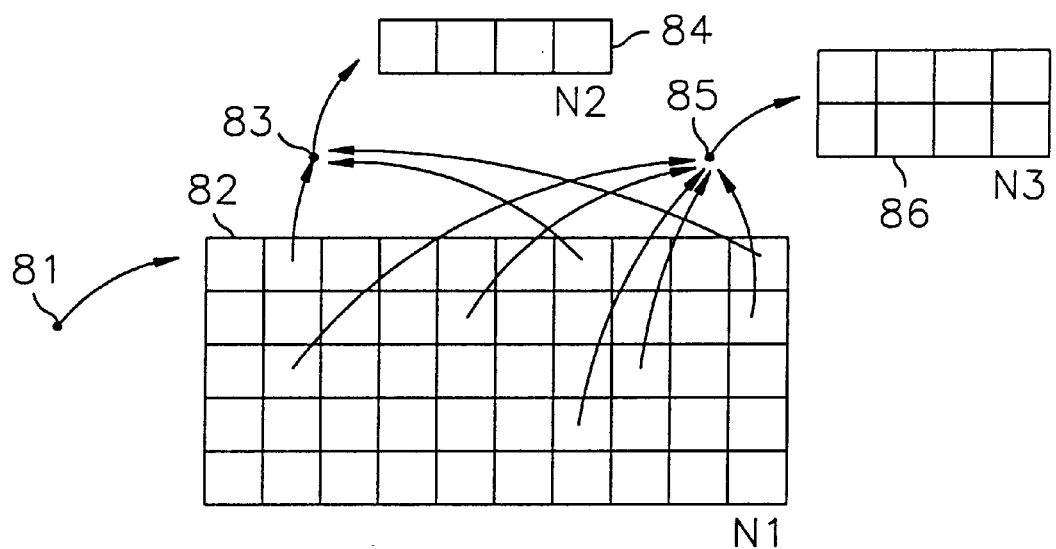
FIG. 7 offers a bandwidth allocation table in accordance with a third embodiment of the present invention.

Referring to FIG. 7, there is provided a bandwidth allocation table in accordance with a third embodiment of the present invention. In the third embodiment, a sub-table can be shared by a plurality of entries of a main table by being accessed by a sub-entry pointer indicated by a sub-table pointer to thereby allocate a bandwidth with more flexibility.

A bandwidth allocation table 80 includes a main entry pointer 81, a main table 82, a plurality of sub-entry pointers and a plurality of sub-tables, only 2 sub-entry pointers, i.e., a first sub-entry pointer 83 and a second sub-entry pointer 85 and only 2 sub-tables, i.e., a first sub-table 84 and a second sub-table 86 being shown for the sake of simplicity.

A flag of an entry of the main table 82 indicates whether contents of the entry of the main table 82 is an index of a virtual channel or a sub-table pointer indicating a sub-entry pointer. For example, if a flag is "0", the contents of a corresponding entry of the main table 82 is an index of a virtual channel; and if the flag is "1", the contents of the corresponding entry of the main table 82 is a sub-table pointer indicating a sub-entry pointer, wherein the sub-entry pointer indicates an. entry of a corresponding sub-table and an index of a virtual channel is recorded at the entry of the sub-table.

In the third embodiment, if the number of entries of the main table 82 is N1 among which 3 and 5 entries indicate the sub-entry pointers 83 and 85 and the table 80 includes 2 sub-tables 84 and 86 as shown in FIG. 7, a bandwidth allocated for each of the sub-tables and the entries of the main table 82 having indices of virtual channels as the contents thereof is determined as L/(number of entries of the main table—number of entries having sub-table pointer+ number of sub-tables), i.e., L/(N1-6), L being a bandwidth assigned for all the channels registered in the table 80. Further, when the sub-tables 84 and 86 include N2, e.g., 4, and N3, e.g., 8, entry sites therein as shown in FIG. 7, bandwidth allocated to virtual channels registered in the sub-tables 84 and 86 are L/N2(N1-6) and L/N3(N1-6), respectively.

Figure 8:
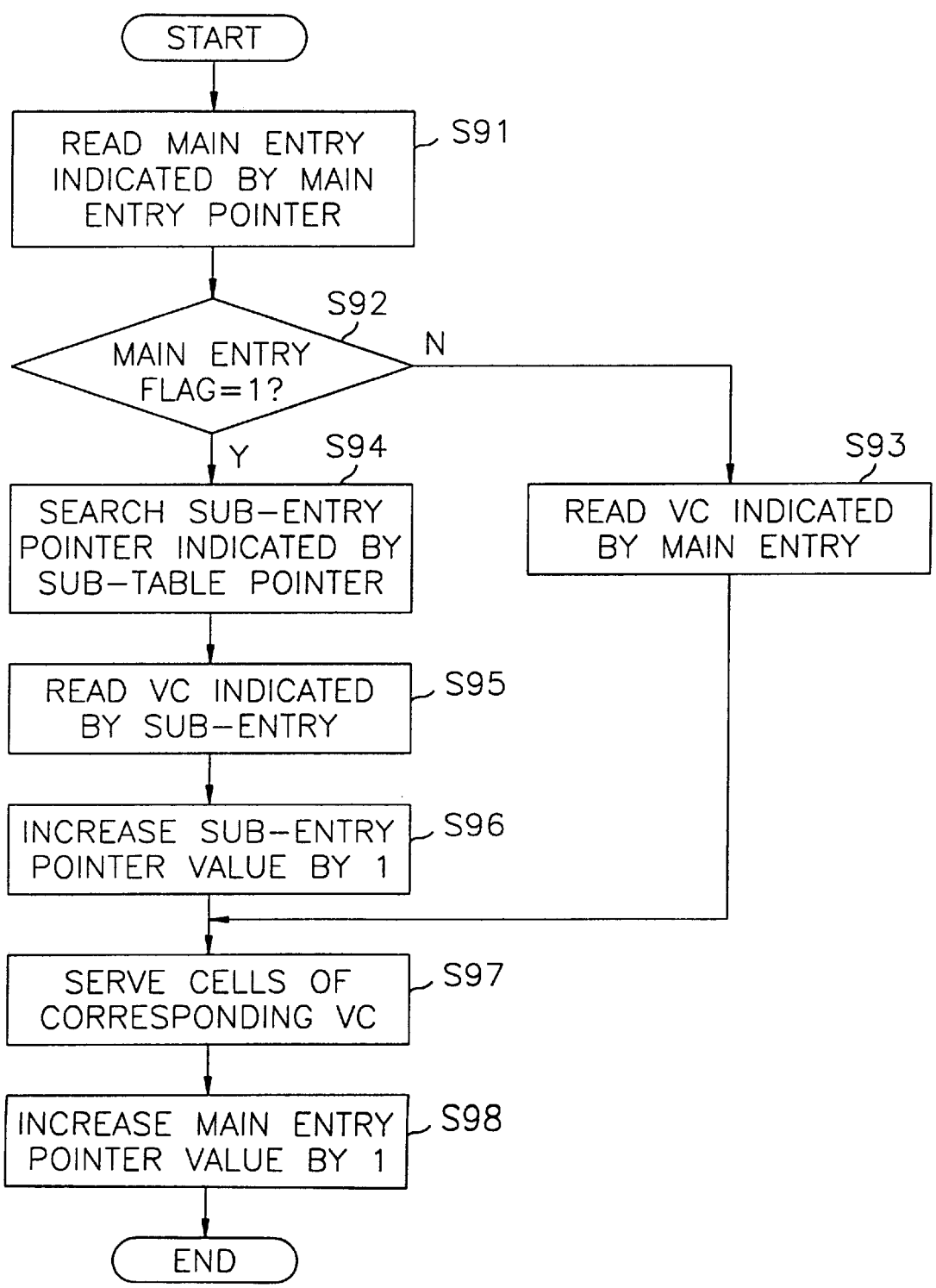
FIG. 8 is a flow chart for allocating a bandwidth to a virtual channel in accordance with the third embodiment of the present invention.

In reference to FIG. 8, there is illustrated a procedure to allocate a bandwidth to a virtual channel in accordance with the third embodiment of the present invention.

The procedure starts with step S91 which reads an entry of a main table indicated by a main entry pointer. At step S92, the contents of the entry of the main entry is examined by checking a flag of the main entry. If the flag is "0", the procedure goes to step S93, wherein a virtual channel VC corresponding to an index recorded at the main entry is recognized; and if the flag is "1", the procedure goes to step S94.

At step S94, a sub-entry pointer indicated by a sub-table pointer recorded at the main entry of the main table is read, and at step S95, an entry of a sub-table indicated by the sub-entry pointer is read, wherein the contents of the entry of the sub-table is an index of a virtual channel VC to be serviced. Then at step S96, the sub-entry pointer is increased by 1 to thereby indicate a next entry of the sub-table.

At step S97, the virtual channel VC read at step S93 or S95 is served and at step S98 the main entry pointer is increased by 1 to thereby indicate a next main entry. For the next main entry of the main table, the same procedure is repeated.

In accordance with the present invention, it is possible to efficiently allocate a bandwidth to a virtual channel by using sub-tables to thereby reduce bandwidth quantization loss.

While the present invention has been described with respect to certain preferred embodiments only, other modifications and variations may be made without departing from the spirit and scope of the present invention as set forth in the following claims.

What is claimed is:

1. A method for allocating bandwidth to virtual channels by using a bandwidth allocation table in an ATM network, wherein the bandwidth allocation table has a main table divided into a multiplicity of entries and each entry has a plurality of sub-tables, comprising the steps of:
    (a) checking a flag of an entry of the main table;
    (b) reading an index of a virtual channel recorded at the entry of the main table if the flag has a first value;
    (c) detecting an entry of a sub-table at which the index of the virtual channel is recorded and reading the index if the flag has a second value;
    (d) serving cells of the virtual channel corresponding to the index; and
    (e) repeating the steps (a) to (d) until cells of a virtual channel corresponding to a last entry of the main table are serviced.

2. The method as recited in claim 1, wherein the step (c) includes the steps of:
    (c1) checking a flag of an entry of an ith sub-table, wherein the entry of the ith sub-table is indicated by contexts recorded at an entry of an (i−1)st sub-table, i being 1 and 0th sub-table being the main table;
    (c2) reading an index of a virtual channel recorded at the entry of the ith sub-table if the flag has a first value; and
    (c3) increasing i by 1 and going back to step (c1) if the flag has a second value.

3. The method, as recited in claim 2, the plurality of sub-tables corresponding to an entry of the main table are hierarchically structured, an (i+1)st sub-table having lower hierarchy than an ith sub-table.

4. The method as recited in claim 3, wherein an entry of the ith sub-table is indicated by a pointer.

5. The method as recited in claim 4, wherein the pointer is increased by 1 after the entry indicated by the pointer is read to thereby indicate a next entry.

6. A method for allocating bandwidth to virtual channels by using a bandwidth allocation table in an ATM network, wherein the bandwidth allocation table has a main table divided into a multiplicity of entries and a plurality of sub-tables, comprising the steps of:
    (a) checking a flag of an entry of the main table;
    (b) reading an index of a virtual channel recorded at the entry of the main table if the flag has a first value;
    (c) detecting an entry of a sub-table at which an index of a virtual channel is recorded and reading the index of the virtual channel if the flag has a second value;
    (d) serving cells of the virtual channel corresponding to the index; and
    (e) repeating the steps (a) to (d) until cells of a virtual channel corresponding to a last entry of the main table are serviced.

7. The method as recited in claim 6, wherein the step (c) includes the steps of:
    (c1) reading the entry of the main table;
    (c2) accessing a sub-table indicated by the entry of the main table; and
    (c3) reading an index of a virtual channel recorded at an entry of the sub-table.

8. The method as recited in claim 7, wherein the entry of the main table is a pointer indicating a sub-table if the flag has a second value.

9. The method as recited in claim 8, wherein an entry of the main table is indicated by a pointer.

10. The method as recited in claim 9, wherein the pointer is increased by 1 after the entry indicated by the pointer is read to thereby indicate a next entry.

* * * * *